(12) United States Patent
Gorsica, IV et al.

(10) Patent No.: US 10,976,799 B2
(45) Date of Patent: Apr. 13, 2021

(54) EXTENDING ELECTRONIC DEVICE SENSORS THROUGH DEVICE MOUNTS

(71) Applicant: Motorola Mobility LLC, Chicago, IL (US)

(72) Inventors: John J. Gorsica, IV, Round Lake, IL (US); Rachid M. Alameh, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 39 days.

(21) Appl. No.: 16/220,894

(22) Filed: Dec. 14, 2018

(65) Prior Publication Data
US 2020/0192460 A1 Jun. 18, 2020

(51) Int. Cl.
*G06F 3/041* (2006.01)
*G06F 1/3234* (2019.01)
*G06K 9/00* (2006.01)

(52) U.S. Cl.
CPC ............ *G06F 1/3265* (2013.01); *G06F 3/041* (2013.01); *G06K 9/00013* (2013.01)

(58) Field of Classification Search
CPC .... G06F 1/3265; G06F 3/041; G06K 9/00013
See application file for complete search history.

(56) References Cited

U.S. PATENT DOCUMENTS

| | | |
|---|---|---|
| 8,294,691 B2 | 10/2012 | Cady et al. |
| 9,579,048 B2 * | 2/2017 | Rayner ................. A61B 5/1118 |
| 2012/0176358 A1 | 7/2012 | Kaji et al. |
| 2013/0076614 A1 * | 3/2013 | Ive ......................... G06F 1/1632 345/156 |
| 2013/0310658 A1 * | 11/2013 | Ricks ................. A61B 5/02055 600/301 |
| 2014/0067828 A1 * | 3/2014 | Archibong ............ G06F 3/0481 707/748 |
| 2014/0228649 A1 * | 8/2014 | Rayner ................ A61B 5/6898 600/301 |
| 2014/0240253 A1 * | 8/2014 | Choi ........................ G06F 3/044 345/173 |
| 2015/0035771 A1 * | 2/2015 | Park ...................... H04M 1/185 345/173 |

(Continued)

OTHER PUBLICATIONS

"Shapeheart Armband { Heart rate tracking & easy phone access", Retrieved at: https://www.kickstarter.com/projects/2052448589/shapeheart-armband-heart-rate-tracking-and-easy-ph—on Nov. 19, 2018, 23 pages.

*Primary Examiner* — Carolyn R Edwards
(74) *Attorney, Agent, or Firm* — FIG. 1 Patents

(57) ABSTRACT

An electronic device includes one or more sensors to determine when the device is in use (e.g., being held or worn by the user) and when the device is not in use (e.g., is in a pocket or purse). Examples of such sensors include a capacitive sensor, a thermal sensor, a light sensor, etc. The device can be placed in a mount that allows the device to be more easily worn by the user. The mount extends the capabilities of the sensors on the device so that the sensors on the device can sense information through (or notwithstanding) the mount. The mount also optionally changes the viewpoints of one or more of the sensors, such as by re-directing a sensor that points to the side of the device so that rather than sensing information at the side of the mount information at the bottom of the mount is sensed.

20 Claims, 9 Drawing Sheets

(56) References Cited

U.S. PATENT DOCUMENTS

| | | | |
|---|---|---|---|
| 2015/0036065 A1* | 2/2015 | Yousefpor | H04M 1/0266 349/12 |
| 2015/0130743 A1* | 5/2015 | Li | G06F 3/017 345/174 |
| 2017/0038793 A1* | 2/2017 | Kallman | G06F 1/163 |
| 2017/0109561 A1* | 4/2017 | Wyrwas | G06F 3/0443 |

* cited by examiner

EXTENDING ELECTRONIC DEVICE SENSORS THROUGH DEVICE MOUNTS

BACKGROUND

As technology has advanced, mobile electronic devices that are powered by batteries have become increasingly commonplace. While these mobile devices offer a variety of different benefits, they are not without their problems. One such problem is that the batteries have a limited lifetime, operating the mobile device for a limited amount of time before needing recharging or replacing. To assist in prolonging the battery life, some mobile devices can operate in multiple different power modes, such as a low power mode when performing some operations and a high power mode when performing other operations. Determining when the mobile device can be placed in a low power mode and when the mobile device can be placed in a high power mode can be challenging to determine, creating situations in which more power is expended by the mobile device than needed. This can result in shorter battery life for the mobile device, which can lead to user dissatisfaction and frustration with their mobile devices.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, a device mount is attachable to an electronic device. The device mount extends a first sensor on the electronic device to sense information regarding an environment in which the electronic device is placed and re-directs a viewpoint of the first sensor.

BRIEF DESCRIPTION OF THE DRAWINGS

Embodiments of extending electronic device sensors through device mounts are described with reference to the following drawings. The same numbers are used throughout the drawings to reference like features and components.

DETAILED DESCRIPTION

Figure 1:
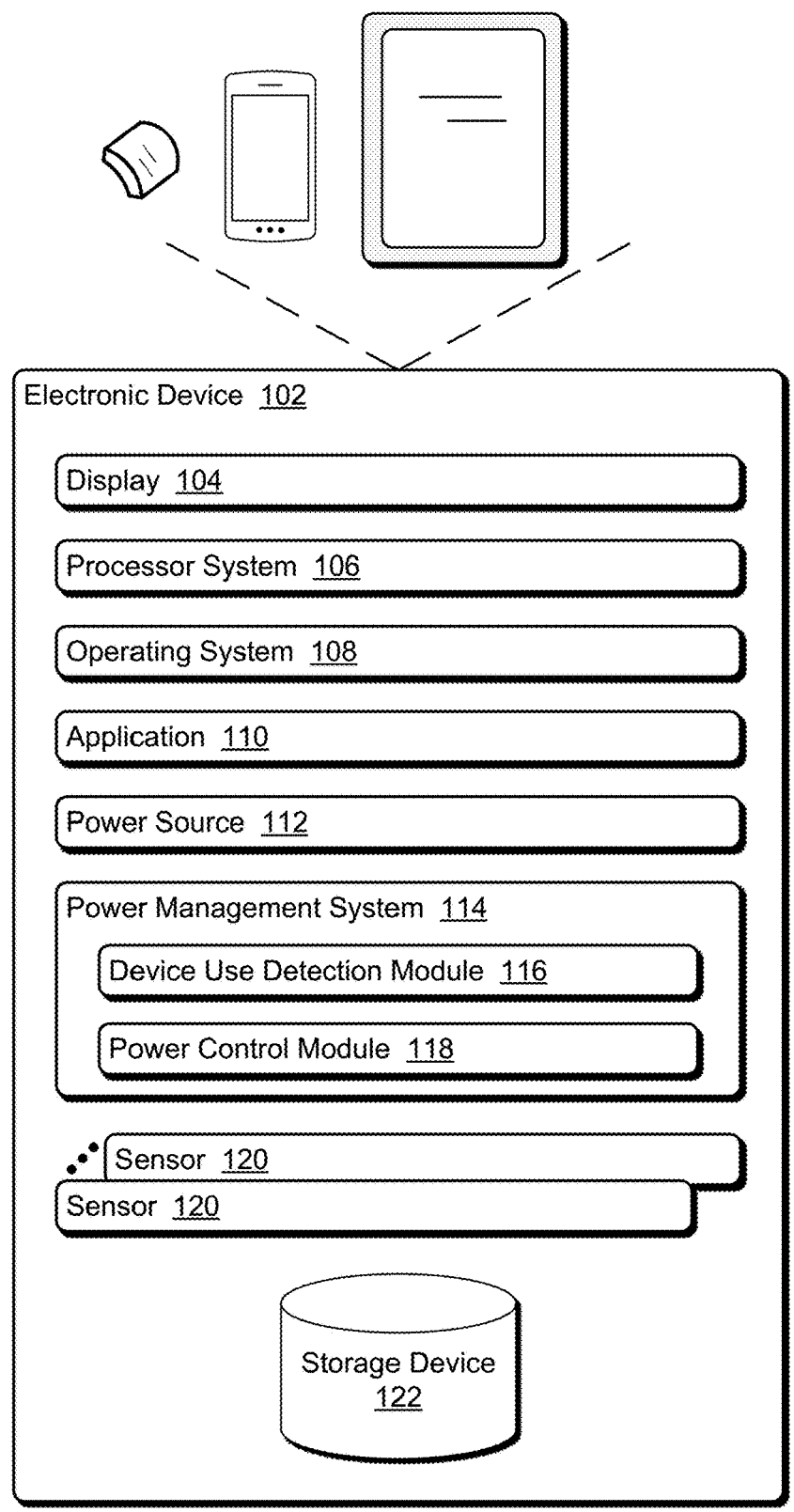
FIG. 1 illustrates an example electronic device that can be used with the techniques discussed herein.

Extending electronic device sensors through device mounts is discussed herein. A mobile electronic device refers to an electronic device powered by a battery or other portable power supply. The electronic device can perform any of a variety of different operations, such as recording various biometric information regarding a user wearing the electronic device, performing communication operations (e.g., sending and receiving phone calls, sending and receiving text messages), performing location tracking of the electronic device, any operations of a traditional computing device, and so forth.

The electronic device can be placed in a device mount (also referred to as simply a mount) that allows the electronic device to be more easily worn by the user, that protects the electronic device from physical impacts or the elements, and so forth. The mount can be any of a variety of different peripherals, such as a carrying case, a band or strap holding the electronic device and worn by a user, and so forth. The mount can optionally provide additional functionality, such as additional sensors to sense information that the electronic device itself does not have sensors to sense, a processor to process or analyze information sensed by a sensor of the mount or the electronic device, a display to display information generated by the electronic device or a processor of the electronic device, and so forth.

The electronic device includes one or more sensors of the same or different types to determine when the electronic device is in use (e.g., the electronic device is being held or worn by the user) and when the electronic device is not in use (e.g., the electronic device is in a pocket or purse). These sensors can include, for example, a capacitive sensor, a thermal sensor, a light sensor, and so forth. When the electronic device is not in use, the electronic device operates in a low power mode, such as a sleep mode in which the electronic device can perform operations to determine when the electronic device is again in use, but performs few or no other operations. When the electronic device is in use, the electronic device operates in a high power mode in which the electronic device performs additional operations. For example, when not in use the electronic device may not collect biometric information regarding the user, but when in use the electronic device does collect biometric information regarding the user. The low power mode consumes less power than the high power mode, thus extending the battery life of the electronic device when the electronic device can operate in the low power mode.

The mount extends the capabilities of sensors on the electronic device so that the sensors on the electronic device can sense information through (or notwithstanding) the mount. The capabilities of the sensors can be extended in different manners based on the type of the sensor. For example, a capacitive sensor can be extended by including a piece of metal in the mount that is both close to the sensor and capacitively contacts a user's body when the mount is worn by the user, a thermal sensor can be extended by including a thermal conductor in the mount, an optical sensor can be extended by including a mirrored cavity or a light pipe in the mount, and so forth. By extending the sensors in the electronic device, the sensors in the electronic device can be used despite the electronic device being placed in the mount.

In addition to extending the sensors, the mount also optionally changes the viewpoint of the sensors. The mount can change (re-direct) the viewpoints of one or more of the sensors, such as by changing the field of view of the sensor, the location of the sensor, the size of the sensor, the magnification of the sensor, and so forth. The mount can re-direct the spatial location of the sensor, for example by re-directing a thermal sensor situated on the right side of the electronic device so that rather than sensing temperature at the right side of the mount the thermal sensor senses temperature at the bottom of the mount. The mount can also re-direct the line of sight of a sensor, for example by re-directing the sensor to capture light from the bottom of the mount rather than the right side of the electronic device or mount.

The techniques discussed herein improve power usage in the electronic device by allowing information to be sensed despite the electronic device being placed in the mount. Thus, rather than the mount covering up the sensor and rendering the sensor ineffective, the sensor can sense information through the mount. Furthermore, the techniques discussed herein allow the sensors on the electronic device to essentially be re-used by the mount. The electronic device need not be programmed or configured to receive data from additional types of sensors. Rather, the electronic device receives data from the sensors on the electronic device. Additionally, the techniques discussed herein allow the sensors to be re-directed for use with different types of mounts in different situations. For example, if an electronic device is expected to be touched on its side and the electronic device has a sensor located on the side of the electronic device, but the sensor is placed in a mount that is worn as jewelry by the user, the mount can re-direct the sensor so that the sensor senses information properly from the bottom or back of the mount when the electronic device is placed in the mount and worn by the user.

FIG. 1 illustrates an example electronic device 102 that can be used with the techniques discussed herein. The electronic device 102 is a mobile device, powered by a battery or other portable power source. The electronic device 102 can be, or include, many different types of computing or electronic devices. For example, the electronic device 102 can be a smartphone or other wireless phone, a camera (e.g., compact or single-lens reflex), a wearable device (e.g., a smartwatch, an augmented reality headset or device, a virtual reality headset or device), a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, a fitness tracker or other biometric information tracker, and so forth.

The electronic device 102 optionally includes a display 104. The display 104 can be configured as any suitable type of display, such as an organic light-emitting diode (OLED) display, active matrix OLED display, liquid crystal display (LCD), in-plane shifting LCD, projector, and so forth. Although illustrated as part of the electronic device 102, it should be noted that the display 104 can be implemented separately from the electronic device 102. In such situations, the electronic device 102 can communicate with the display 104 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. The display 104 can also optionally operate as an input device (e.g., the display 104 can be a touchscreen display).

The electronic device 102 also includes a processor system 106 that includes one or more processors, each of which can include one or more cores. The processor system 106 is coupled with, and may implement functionalities of, any other components or modules of the electronic device 102 that are described herein. In one or more embodiments, the processor system 106 includes a single processor having a single core. Alternatively, the processor system 106 includes a single processor having multiple cores and/or multiple processors (each having one or more cores).

The electronic device 102 also includes an operating system 108. The operating system 108 manages hardware, software, and firmware resources in the electronic device 102. The operating system 108 manages one or more applications 110 optionally running on the electronic device 102, and operates as an interface between applications 110 and hardware components of the electronic device 102.

The electronic device 102 also includes a power source 112. The power source 112 can be any of a variety of different components that store energy to power the electronic device 102. In one or more embodiments the power source 112 is a battery. However, the power source 112 can alternatively be implemented in different manners, such as using supercapacitors.

The electronic device 102 also includes a power management system 114. The power management system 114 manages power in the electronic device 102, including determining when to switch between different power modes (e.g., a low power mode and a high power mode), implementing the switching between different power modes, and so forth. The power management system 114 includes a device use detection module 116 and a power control module 118. The device use detection module 116 determines whether the electronic device 102 is in use or not in use, and the power control module 118 manages switching the electronic device 102 from one power mode to another (e.g., between a low power mode and a high power mode).

The electronic device 102 also includes one or more sensors 120. The one or more sensors 120 can include various different types of sensors, and can include multiple sensors of the same or different types. Each of these sensors 120 can sense various information regarding the environment in which the electronic device 102 is placed, such as an amount of light in the environment, a temperature of the environment, whether a user is touching the electronic device 102, and so forth.

One type of sensor 120 is a capacitive sensor, such as a self-capacitive battery powered sensor. A capacitive sensor detects an object if the object is capacitively coupled to ground, such as the human body. Thus, for example, a capacitive sensor 120 can detect that the electronic device 102 is being held or worn by a user if the user's skin is capacitively coupled to (e.g., in physical contact with) the capacitive sensor 120.

Another type of sensor 120 is a thermal sensor. A thermal sensor detects a warm or cold object if the object is in the field of view of the thermal sensor and within the temperature range of the thermal sensor. The field of view of a thermal sensor can vary by implementation, for example ranging from 30 degrees to 180 degrees. The temperature range of a thermal sensor can also vary by implementation, for example ranging from 30 degrees Fahrenheit to 110 degrees Fahrenheit. Thus, for example, a thermal sensor 120 can detect that the electronic device 102 is being held or worn by a user if the user is within the field of view of the thermal sensor 120 and the temperature sensed by the thermal sensor 120 is a human body temperature (e.g., a typical temperature for human skin, such as from 85 degrees Fahrenheit to 98 degrees Fahrenheit).

Another type of sensor 120 is an optical sensor. An optical sensor detects the presence of an optically reflective surface within a field of view of the optical sensor and within a threshold range (e.g., close proximity) of the optical sensor. The field of view of an optical sensor can vary by implementation, for example from 30 degrees to 180 degrees. The range of the optical sensor can vary by implementation, for example from 0 inches to 6 inches. Thus, for example, an optical sensor 120 can detect that the electronic device 102 is being held or worn by a user if the user is within the field of view (e.g., 120 degrees) and within the threshold range (e.g., less than 6 inches) of the optical sensor 120.

Another type of sensor 120 is an ambient light sensor. An ambient light sensor detects the amount of light within a field of view of the ambient light sensor. The field of view of an ambient light sensor can vary by implementation, for example from 30 degrees to 180 degrees. Thus, for example, an ambient light sensor 120 can detect that the electronic device 102 is not being held or worn by a user if the amount of light within the field of view (e.g., 120 degrees) is greater than a threshold amount (e.g., 20 lux).

Although particular types of sensors 120 are discussed herein, it should be noted that these particular types of sensors 120 are examples. The techniques discussed herein can additionally or alternatively work with other types of sensors.

The device use detection module 116 determines whether the electronic device 102 is in use or not in use. The electronic device 102 being in use refers to the electronic device 102 being held or worn by a user. The electronic device 102 being not in use refers to the electronic device 102 not being held and not being worn by a user (e.g., the electronic device 102 is in a bag or pocket). The device use detection module 116 uses information obtained from one or more of the sensors 120 to determine whether the electronic device 102 is in use or not in use. The device use detection module 116 can utilize any of a variety of public and/or proprietary techniques to determine whether the electronic device 102 is in use of not in use.

For example, the device use detection module 116 can determine that the electronic device 102 is in use if at least one sensor 120 detects that the electronic device 102 is being held or worn by a user. By way of another example, the device use detection module 116 can determine that the electronic device 102 is in use if a threshold number of multiple (e.g., at least two) sensors 120 detect that the electronic device 102 is being held or worn by a user. Various other rules, algorithms, criteria, etc. can be used by the device use detection module 116 to determine whether the electronic device 102 is being held or worn by a user.

The power control module 118 manages switching the electronic device 102 from one power mode to another (e.g., between a low power mode and a high power mode). In one or more embodiments, the electronic device 102 operates in two power modes (low power mode and high power mode), although alternatively the electronic device 102 can operate in any number of different power modes. The device use detection module 116 provides an indication to the power control module 118 of whether the electronic device 102 is in use or not in use. The power control module 118 switches the electronic device 102 to (or keeps the electronic device 102 in) a low power mode in response to the device use detection module 116 determining that the electronic device 102 is not in use. The power control module 118 switches the electronic device 102 to (or keeps the electronic device 102 in) a high power mode in response to the device use detection module 116 determining that the electronic device 102 is in use.

The power control module 118 can take any one or more of a variety of different actions to switch between a low power mode and a high power mode. For example, the power control module 118 can shut down one or more processors or cores of the processor system 106 to switch to a low power mode, and activate one or more (e.g., all) processors and cores of the processor system 106 to switch to a high power mode. By way of another example, the power control module 118 can reduce the frequency that a processor or core of the processor system 106 is running at to switch to a low power mode, and increase the frequency that a processor or core of the processor system 106 is running at to switch to a high power mode. By way of another example, the power control module 118 can turn off the display device 104 to switch to a low power mode, and turn on the display device 104 to switch to a high power mode.

Additionally or alternatively, the device use detection module 116 can determine how the device is being held or worn by a user. For example, the device use detection module 116 can determine that the electronic device 102 is being held in the hand of the user if one sensor 120 (e.g., extended to the side of the mount) detects that the electronic device 102 is being held or worn by the user, and determine that the electronic device 102 is being worn on the wrist (or arm, or chest, etc.) if another sensor (e.g., re-directed to the bottom of the mount) detects that the electronic device 102 is being worn by the user. This extension and re-direction of the sensors 120 is discussed in more detail below.

Various programs on the electronic device 102 (e.g., an application 110, a program of the operating system 108) can obtain an indication of how the electronic device 102 is being worn from the device use detection module 116. Such a program can then take various actions to change the operation of the electronic device 102 based on how the electronic device 102 is being worn by the user. For example, the information displayed on the display 104 can change, whether the display 104 is activated can change, a font or size of information displayed on the display 104 can change, different biometric data can be tracked (e.g., heart rate can be monitored if the electronic device 102 is worn on the user's arm or wrist, but not if the electronic device 102 is being held in the user's hand).

The electronic device 102 also includes a storage device 122. The storage device 122 can store various data obtained or generated by the operating system 108, an application 110, a sensor 120, combinations thereof, and so forth. The storage device 122 can be implemented using any of a variety of storage technologies, such as magnetic disk, optical disc, Flash or other solid state memory, and so forth.

The electronic device 102 can be placed in a mount that allows the electronic device 102 to be more easily worn by the user, protects the electronic device 102 from physical impacts, protects the electronic device 102 from dust and dirt, protects the electronic device 102 from the elements, and so forth. The mount optionally provides additional functionality, such as including additional sensors to sense information that the electronic device 102 alone is not able to sense. The electronic device 102, attached to the mount, is typically worn by the user. The mount can take any of a variety of different forms, such as an armband, a wristband, a pendant or lanyard, a clip (e.g., attached to the user's clothing), and so forth.

The electronic device 102 can be attached or coupled to the mount in one or more of any of a variety of different manners. The electronic device 102 is typically attached or coupled to the mount in a removable manner, allowing the electronic device 102 to remain firmly attached or coupled to the mount, but also allowing the user to remove the electronic device 102 from the mount (so that the electronic device 102 is no longer attached or coupled to the mount) as desired by the user. For example, the electronic device 102 can be attached or coupled to the mount using a magnetic coupling (e.g., a magnet placed in one or both of the electronic device 102 and the mount). By way of another example, the electronic device 102 can be attached or coupled to the mount using a physical coupling (e.g., a flange or lip from the mount that extends over a portion of the electronic device 102, a latch or other fastening mechanism, and so forth).

The mount can take any of a variety of different forms. For example, the mount with the electronic device 102 attached thereto can be designed to be worn as a piece of jewelry (e.g., wristband, ring, pendant or necklace, etc.). By way of another example, the mount with the electronic device 102 attached thereto can be designed to be held by a user in his or her hand.

Figure 2:
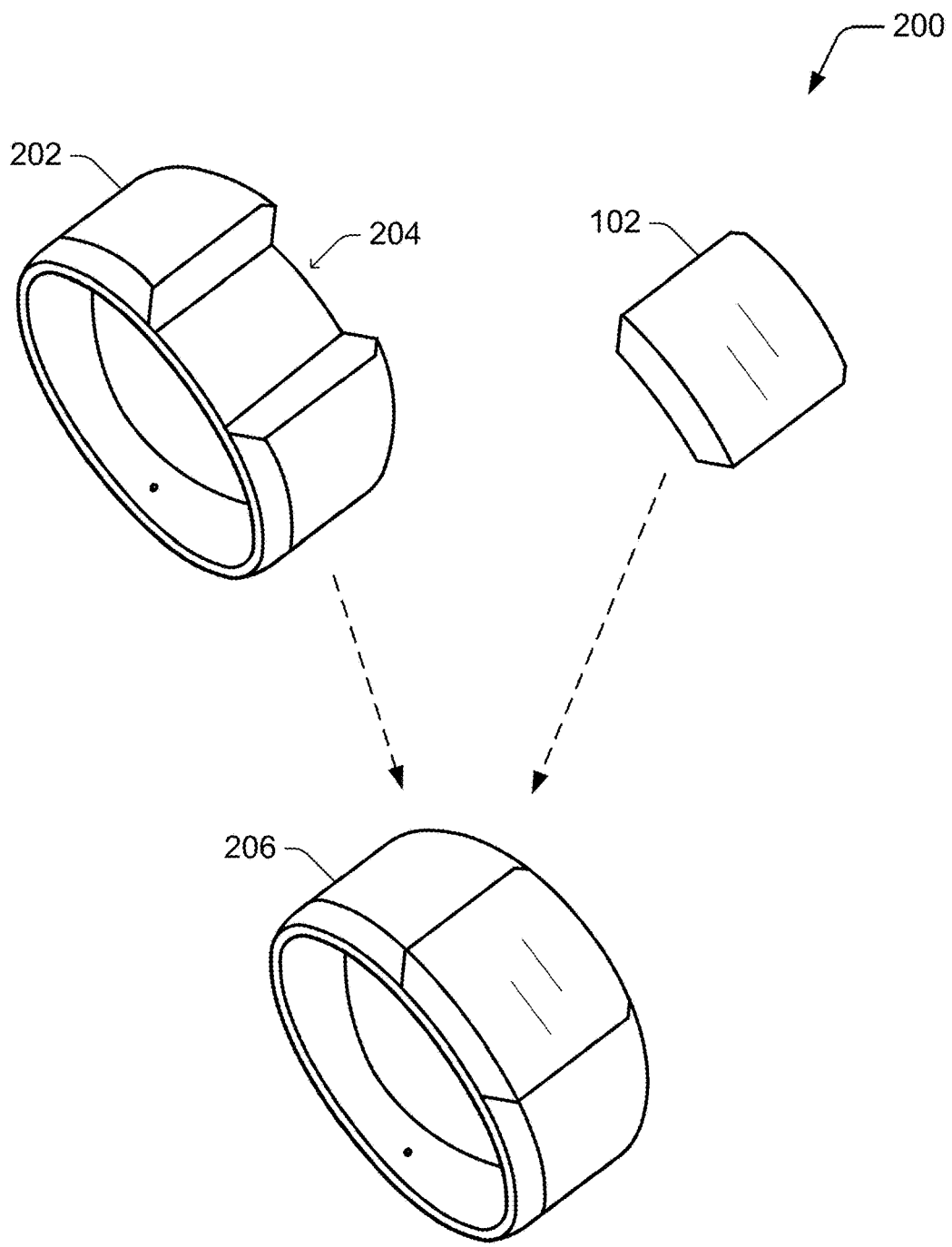
FIG. 2 illustrates an example system including a mount and an electronic device in accordance with one or more embodiments.

FIG. 2 illustrates an example system 200 including a mount and an electronic device in accordance with one or more embodiments. The system 200 includes a mount 202 in the form of a wristband. The mount 202 has an opening 204 into which the electronic device 102 can be inserted, as illustrated at 206.

Figure 3:
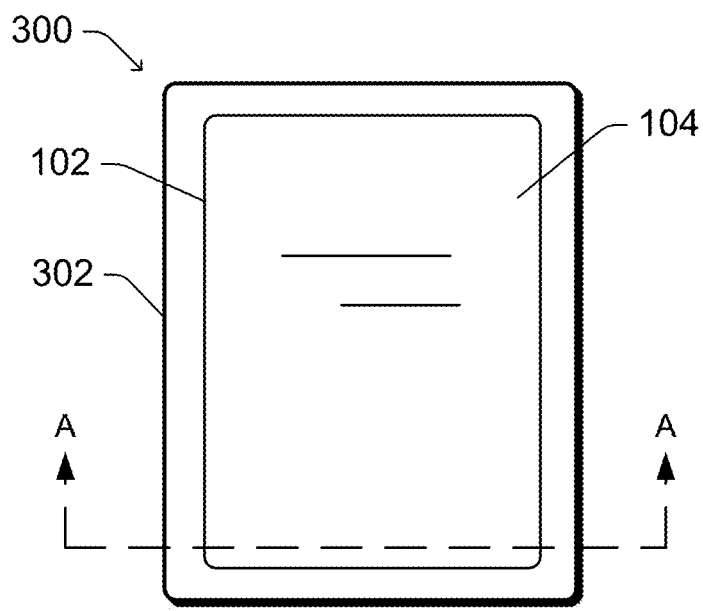
FIG. 3 illustrates another example system including a mount and an electronic device in accordance with one or more embodiments.

FIG. 3 illustrates another example system 300 including a mount and an electronic device in accordance with one or more embodiments. FIG. 3 shows a top view of the system 300, which includes a mount 302 in the form of a case that can be held in the user's hand or worn as a pendant. The electronic device 102 is attached to the mount 302 with the display 104 remaining visible. The display 104 can be visible, for example, via an opening in the mount 302 or a transparent overlay covering the display 104.

FIGS. 4-12 illustrate example cross-sections of a system including a mount and an electronic device. These cross-sections can be, for example, of the system 300 of FIG. 3 taken along and in the direction of the arrows of the dashed line A. The mount extends the capabilities of sensors 120 on the electronic device 102 so that the sensors 120 on the electronic device 102 can sense information through (or notwithstanding) the mount 302. The capabilities of the sensors 120 can be extended in different manners based on the types of the sensors 120, as discussed in more detail below. In addition to extending the sensors 120, the mount 302 also optionally re-directs the sensors 120. The mount 302 can change the viewpoints of one or more of the sensors 120, such as by changing the field of view of the sensor 120, the location of the sensor 120, the size of the sensor 120, the magnification of the sensor 120, and so forth, as discussed in more detail below. The FIGS. 4-12 illustrate examples of extending different sensors 120 and re-directing different sensors 120.

Figure 4:
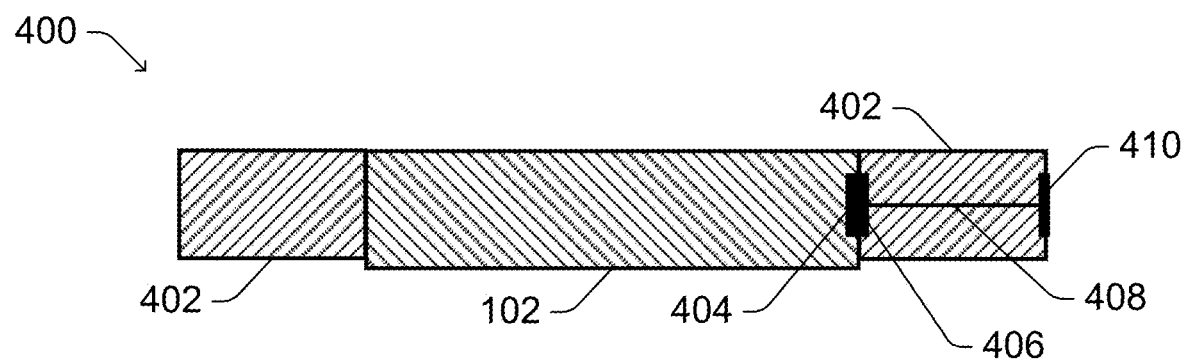
FIGS. 4, 5, 6, 7, 8, 9, 10, 11, and 12 each illustrate an example cross-section of a system including a mount and an electronic device.

FIG. 4 illustrates an example cross-section of a system 400 including a mount and an electronic device. The system 400 includes a mount 402 (e.g., which can be the mount 302 of FIG. 3) and an electronic device 102. The electronic device 102 includes a self-capacitive battery powered sensor (a capacitive sensor) 404 along one edge of the electronic device 102. The mount 402 includes a first conductive plate 406 (e.g., a first piece of metal) that is physically touching the capacitive sensor 404 or that is within a threshold distance (e.g., 3 millimeters) of the capacitive sensor 404 when the electronic device 102 is attached to the mount 402. The mount 402 further includes a conductor 408 (e.g., made of any of a variety of metals) that couples the first conductive plate 406 to a second conductive plate 410 (e.g., a second piece of metal).

If the mount 402 with the electronic device 102 attached is worn by a user and the second conductive plate 410 is capacitively coupled to the user (e.g., physically touching the user's skin), then the capacitive sensor 404 is capacitively coupled to ground via the first conductive plate 406, the conductor 408, and the second conductive plate 410. Thus, the capacitive sensor 404 will detect that the capacitive sensor 404 is touching a user's skin and thus that the electronic device 102 is being held or worn by a user. However, if the mount 402 with the electronic device 102 attached is not worn by a user and the second conductive plate 410 is not capacitively coupled to ground (e.g., the mount 402 with the electronic device 102 attached is in a purse or backpack), the capacitive sensor 404 will not be capacitively coupled to ground and the capacitive sensor 404 will detect that the capacitive sensor 404 is not touching a user's skin, and thus that the electronic device 102 is not being held or worn by a user.

Figure 5:
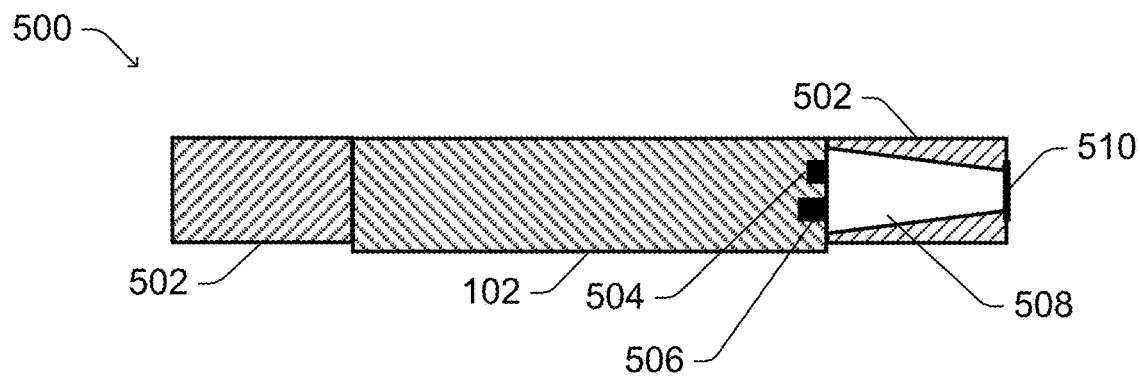

FIG. 5 illustrates an example cross-section of a system 500 including a mount and an electronic device. The system 500 includes a mount 502 (e.g., which can be the mount 302 of FIG. 3) and an electronic device 102. The electronic device 102 includes a thermal sensor 504 and an ambient light sensor 506 along one edge of the electronic device 102. The thermal sensor 504 is a contactless thermal sensor (e.g., a thermopile) that measures thermal radiation. The mount 502 includes an air tunnel 508, which is an opening that extends through the mount 502. A protective covering 510 (e.g., thin polyethylene, such as 1 millimeter wide) is affixed to or part of the mount 502 to cover the air tunnel 508 to protect the sensors 504 and 506.

The air tunnel 508 allows the light external to the mount 502 to pass through the mount 502 and be sensed by the ambient light sensor 506. Similarly, the air tunnel 508 allows the temperature of an object external to the mount 502 at or beyond the protective covering 510 to be sensed by the thermal sensor 504.

Figure 6:
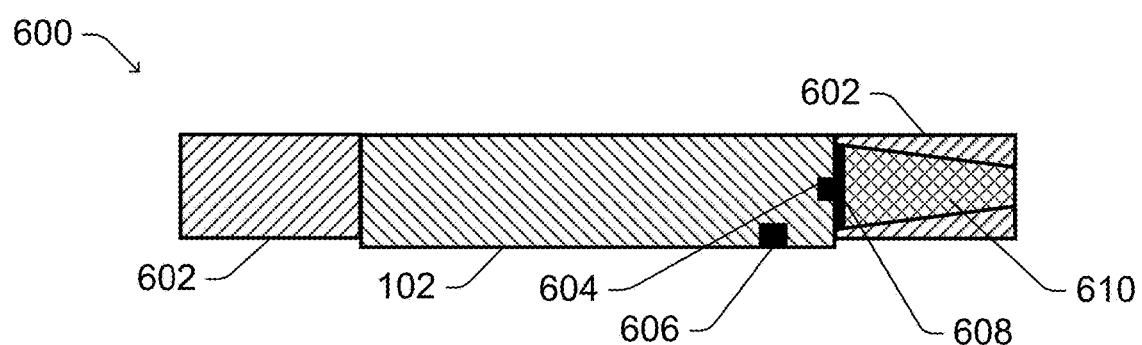

FIG. 6 illustrates an example cross-section of a system 600 including a mount and an electronic device. The system 600 includes a mount 602 (e.g., which can be the mount 302 of FIG. 3) and an electronic device 102. The electronic device 102 includes a thermal sensor 604 along one edge of the electronic device 102 and an ambient light sensor 606 along another edge (the bottom) of the electronic device 102. The thermal sensor 604 can be a contactless or contact-requiring thermal sensor. The mount 602 includes a conductive plate 608 (e.g., a piece of metal) that is physically touching the thermal sensor 604 or that is within a threshold distance (e.g., 3 millimeters) of the thermal sensor 604 when the electronic device 102 is attached to the mount 602. The mount 602 further includes a thermal conductor 610 (e.g., a metal plate) that is physically touching the conductive plate 608 or that is within a threshold distance (e.g., 3 millimeters) of the conductive plate 608, and extends through the mount 602.

The thermal conductor 610 is a thermally conductive plate or other structure, allowing the temperature of the air or other object external to the mount 602 at the thermal conductor 610 to be sensed by the thermal sensor 604. The thermal conductor 610 can be made of any of a variety of thermal conductors, such as graphite. If the thermal conductor 610 is in physical contact with the user's body, then the user's body temperature will heat the thermal conductor 610 and the conductive plate 608, causing the thermal sensor 604 to detect that the thermal sensor 604 is touching a user's skin and thus that the electronic device 102 is being held or worn by a user a body, even though the heat source is remote from the thermal sensor 604. The thermal conductor 610 is opaque and does not allow light to pass through the plate. However, the ambient light sensor 606 is situated on a different edge than the thermal sensor 604 and is not covered by the mount 602. Accordingly, the mount 602 does not interfere with the ability of the ambient light sensor 606 to detect light.

Additionally or alternatively, the mount 602 may not include the conductive plate 608. Rather, the thermal conductor 610 can be physically touching the thermal sensor 604 or within a threshold distance (e.g., 3 millimeters) of the thermal sensor 604 when the electronic device 102 is attached to the mount 602.

Figure 7:
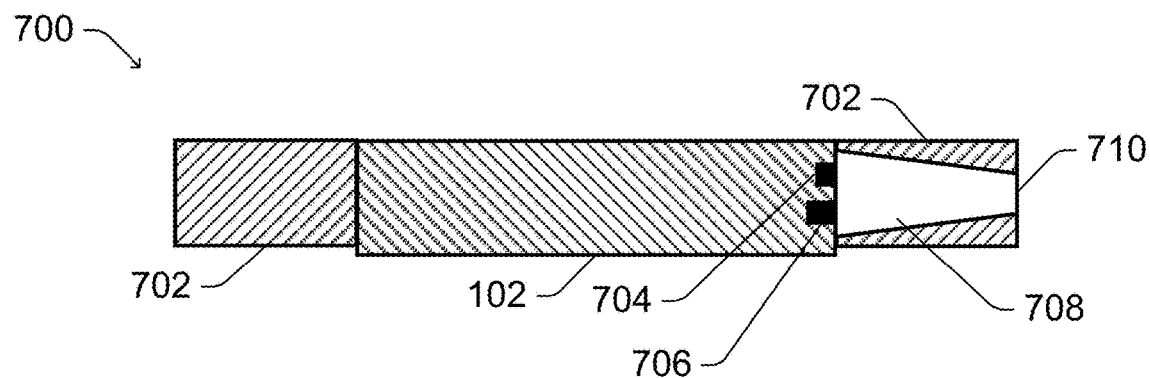

FIG. 7 illustrates an example cross-section of a system 700 including a mount and an electronic device. The system 700 includes a mount 702 (e.g., which can be the mount 302 of FIG. 3) and an electronic device 102. The electronic device 102 includes an optical sensor 704 and an ambient light sensor 706 along one edge of the electronic device 102. The mount 702 includes a light tunnel 708 that extends through the mount 702. The light tunnel 708 allows the light external to the mount 702 to pass through the mount 702 and be sensed by both the optical sensor 704 and the ambient light sensor 706.

The light tunnel 708 can be implemented in various manners to allow light to pass through the light tunnel 708 and be sensed by the optical sensor 704 and the ambient light sensor 706, such as using a mirrored cavity, using a light pipe (e.g., a fiber optic or other material), and so forth. A protective covering 710 (e.g., thin polyethylene, such as 1 millimeter wide) can optionally be affixed to or part of the mount 702 to cover the light tunnel 708 to protect the sensors 704 and 706.

In some situations an optical sensor 120 on the electronic device 102, such as the optical sensor 704, or the device use detection module 116 on the electronic device 102 uses time-of-flight travel time of light to determine whether the electronic device 102 is being held or worn by a user. For example, a light is emitted by the optical sensor 704 (or other component of the electronic device 102) and a determination made of how long it takes for the reflection of the light to be sensed by the optical sensor 704 (the time-of-flight travel time of the light), and given the speed of light the distance from the optical sensor 704 to the object reflecting the light can be readily determined.

This time-of-flight travel time of the light can further be used to determine by one or both of the optical sensor 120 and the device use detection module 116 to determine whether the electronic device 102 is attached to a mount. For example, if the time-of-flight travel time of the light indicates that the light is being reflected by an object (e.g., a finger) that is within a first threshold distance (e.g., 3 millimeters) then the electronic device 120 is being held or worn without a mount, and if the time-of-flight travel time of the light indicates that the light is being reflected by an object (e.g., a finger) that is greater than the first threshold distance (e.g., 3 millimeters) away from the optical sensor 120 but less than a second threshold distance (e.g., 8 millimeters) away from the optical sensor 120 then the electronic device 120 is being held or worn and is attached to a mount.

Thus, it can be seen from the examples of FIGS. 4-7 that the techniques discussed herein allow the sensors 120 to be extended in the same direction through the mount that the electronic device 102 is attached to, allowing the sensors 120 to continue to operate as intended by the designer of the electronic device 102 despite the presence of the mount. For example, the examples of FIGS. 4-7 illustrate that the detecting of a user's finger(s) at the edge of the electronic device 102 can be extended to detecting the user's finger(s) at the corresponding edge (e.g., on a parallel plane) of the mount.

The examples of FIGS. 4-7 extend the sensors 120 through the mount allowing the sensors 120 to sense information through the mount in the same direction as when the electronic device 102 is not attached to the mount. Additionally or alternatively, the mount can re-direct a sensor 120 to sense information in a different direction than when the electronic device 102 is not attached to the mount. The mount can further change the viewpoints of one or more of the sensors, such as by changing the field of view of the sensor, the location of the sensor, the size of the sensor, the magnification of the sensor, and so forth.

Figure 8:
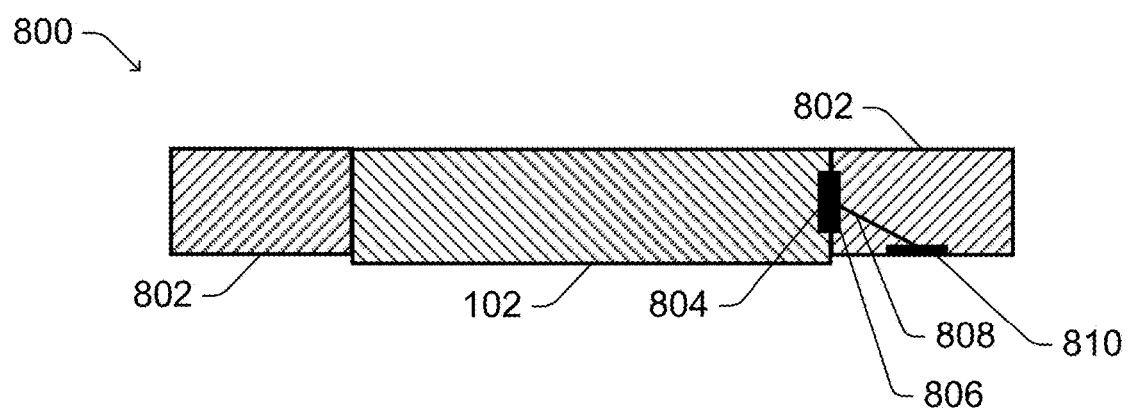

FIG. 8 illustrates an example cross-section of a system 800 including a mount and an electronic device. The system 800 includes a mount 802 (e.g., which can be the mount 302 of FIG. 3) and an electronic device 102. The electronic device 102 includes a self-capacitive battery powered sensor (a capacitive sensor) 804 along one edge of the electronic device 102. The mount 802 includes a first conductive plate 806 (e.g., a first piece of metal) that is physically touching the capacitive sensor 804 or that is within a threshold distance (e.g., 3 millimeters) of the capacitive sensor 804 when the electronic device 102 is attached to the mount 802. The mount 802 further includes a conductor 808 (e.g., made of any of a variety of metals) that couples the first conductive plate 806 to a second conductive plate 810 (e.g., a second piece of metal).

If the mount 802 with the electronic device 102 attached is worn by a user and the second conductive plate 810 is capacitively coupled to the user (e.g., physically touching the user's skin), then the capacitive sensor 804 is capacitively coupled to ground via the first conductive plate 806, the conductor 808, and the second conductive plate 810. Thus, the capacitive sensor 804 will detect that the capacitive sensor 804 is touching a user's skin and thus that the electronic device 102 is being held or worn by a user. However, if the mount 802 with the electronic device 102 attached is not worn by a user and the second conductive plate 810 is not capacitively coupled to ground (e.g., the mount 802 with the electronic device 102 attached is in a purse or backpack), the capacitive sensor 804 will not be capacitively coupled to ground and the capacitive sensor 804 will detect that the capacitive sensor 804 is not touching a user's skin, and thus that the electronic device 102 is not being held or worn by a user.

The system 800 of FIG. 8 is similar to the system 400 of FIG. 4, except that the capacitive sensor 804 has been re-directed. Rather than determining whether the electronic device 102 is being worn by a user based on sensing information along the edge corresponding to (e.g., on a parallel plane as) the capacitive sensor 804, in the system of FIG. 8 whether the electronic device 102 is being worn by a user is determined based on sensing information along a non-corresponding edge to (e.g., on a plane perpendicular to) the capacitive sensor 804. Thus, for example, if the electronic device 102 is not attached to the mount 802 then the capacitive sensor 804 detects when a right side of the electronic device 102 is being touched by a user's finger, but if the electronic device 102 is attached to the mount 802 then the capacitive sensor 804 detects when a bottom of the mount 802 is being touched by a different part of the user's body depending on how the mount is worn (e.g., the user's wrist, the user's arm, the user's chest, etc.).

Figure 9:
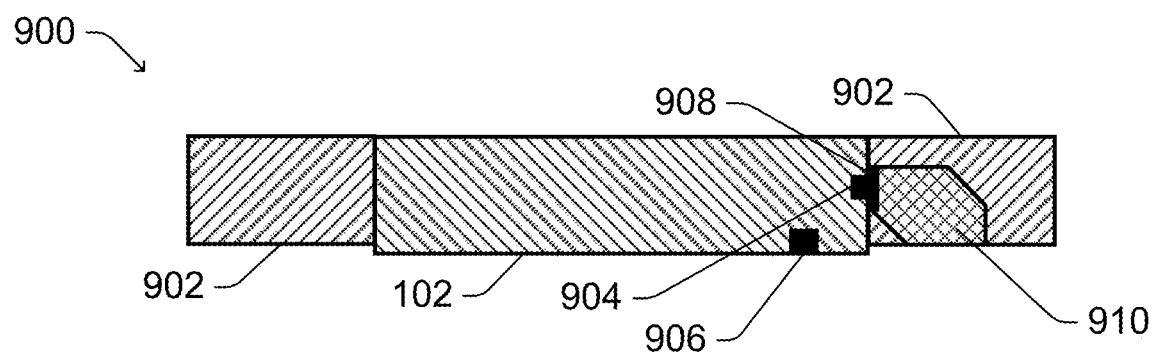

FIG. 9 illustrates an example cross-section of a system 900 including a mount and an electronic device. The system 900 includes a mount 902 (e.g., which can be the mount 302 of FIG. 3) and an electronic device 102. The electronic device 102 includes a thermal sensor 904 along one edge of the electronic device 102 and an ambient light sensor 906 along another edge (the bottom) of the electronic device 102. The thermal sensor 904 can be a contactless or contact-requiring thermal sensor. The mount 902 includes a conductive plate 908 (e.g., a piece of metal) that is physically touching the thermal sensor 904 or that is within a threshold distance (e.g., 3 millimeters) of the thermal sensor 904 when the electronic device 102 is attached to the mount 902. The mount 902 further includes a thermal conductor 910 (e.g., a metal plate) that is physically touching the conductive plate 908 or that is within a threshold distance (e.g., 3 millimeters) of the conductive plate 908, and extends through the mount 902.

The thermal conductor 910 is a thermally conductive plate or other structure, allowing the temperature of the air or other object external to the mount 902 at the thermal conductor 910 to be sensed by the thermal sensor 904. The thermal conductor 910 can be made of any of a variety of thermal conductors, such as graphite. If the thermal conductor 910 is in physical contact with the user's body, then the user's body temperature will heat the thermal conductor 910 and the conductive plate 908, causing the thermal sensor 904 to detect that the thermal sensor 904 is touching a user's skin and thus that the electronic device 102 is being held or worn by a user a body, even though the heat source is remote from the thermal sensor 908. The thermal conductor 910 is opaque and does not allow light to pass through the plate. However, the ambient light sensor 906 is situated on a different edge than the thermal sensor 904 and is not covered by the mount 902. Accordingly, the mount 902 does not interfere with the ability of the ambient light sensor 906 to detect light.

Additionally or alternatively, the mount 902 may not include the conductive plate 908. Rather, the thermal conductor 910 can be physically touching the thermal sensor 904 or within a threshold distance (e.g., 3 millimeters) of the thermal sensor 904 when the electronic device 102 is attached to the mount 902.

The system 900 of FIG. 9 is similar to the system 600 of FIG. 6, except that the thermal sensor 904 has been re-directed. Rather than determining whether the electronic device 102 is being worn by a user based on sensing information along the edge corresponding to (e.g., on a parallel plane as) the thermal sensor 904, in the system of FIG. 9 whether the electronic device 102 is being worn by a user is determined based on sensing information along a non-corresponding edge to (e.g., on a plane perpendicular to) the thermal sensor 904. Thus, for example, if the electronic device 102 is not attached to the mount 902 then the thermal sensor 904 detects when a right side of the electronic device 102 is being touched by a user's finger, but if the electronic device 102 is attached to the mount 902 then the thermal sensor 904 detects when a bottom of the mount 902 is being touched by a different part of the user's body depending on how the mount is worn (e.g., the user's wrist, the user's arm, the user's chest, etc.).

Figure 10:
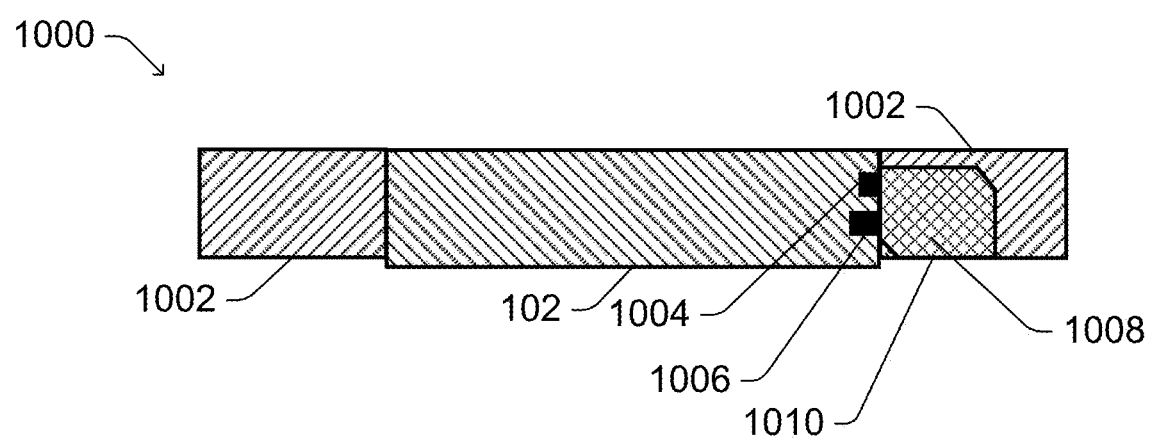

FIG. 10 illustrates an example cross-section of a system 1000 including a mount and an electronic device. The system 1000 includes a mount 1002 (e.g., which can be the mount 302 of FIG. 3) and an electronic device 102. The electronic device 102 includes an optical sensor 1004 and an ambient light sensor 1006 along one edge of the electronic device 102. The mount 1002 includes a light tunnel 1008 that extends through the mount 1002. The light tunnel 1008 allows the light external to the mount 1002 to pass through the mount 1002 and be sensed by both the optical sensor 1004 and the ambient light sensor 1006.

The light tunnel 1008 can be implemented in various manners to allow light to pass through the light tunnel 1008 and be sensed by the optical sensor 1004 and the ambient light sensor 1006, such as using a mirrored cavity (an opening allowing the light to enter and be reflected onto the sensors 1004 and 1006), using a light guide (e.g., a transparent material capable of transmitting light through internal reflections), using a light pipe (e.g., a fiber optic or other material), and so forth. A protective covering 1010 (e.g., thin polyethylene, such as 1 millimeter wide) can optionally be affixed to or part of the mount 1002 to cover the light tunnel 1008 to protect the sensors 1004 and 1006.

The system 1000 of FIG. 10 is similar to the system 700 of FIG. 7, except that the optical sensor 1004 and the ambient light sensor 1006 have been re-directed. Rather than determining whether the electronic device 102 is being worn by a user based on sensing information along the edge corresponding to (e.g., on a parallel plane as) the optical sensor 1004, in the system of FIG. 10 whether the electronic device 102 is being worn by a user is determined based on sensing information along a non-corresponding edge to (e.g., on a plane perpendicular to) the optical sensor 1004. Thus, for example, if the electronic device 102 is not attached to the mount 1002 then the optical sensor 1004 detects when a right side of the electronic device 102 is being touched by a user's finger, but if the electronic device 102 is attached to the mount 1002 then the optical sensor 1004 detects when a bottom of the mount 1002 is being touched by a different part of the user's body depending on how the mount is worn (e.g., the user's wrist, the user's arm, the user's chest, etc.).

In one or more embodiments, different sensors of the same type or different types can be re-directed in different manners by the mount. For example, the mount may extend one sensor without re-directing the sensor, while re-directing one or more other sensors. These sensors can be of the same type, different types, or combinations thereof.

Figure 11:
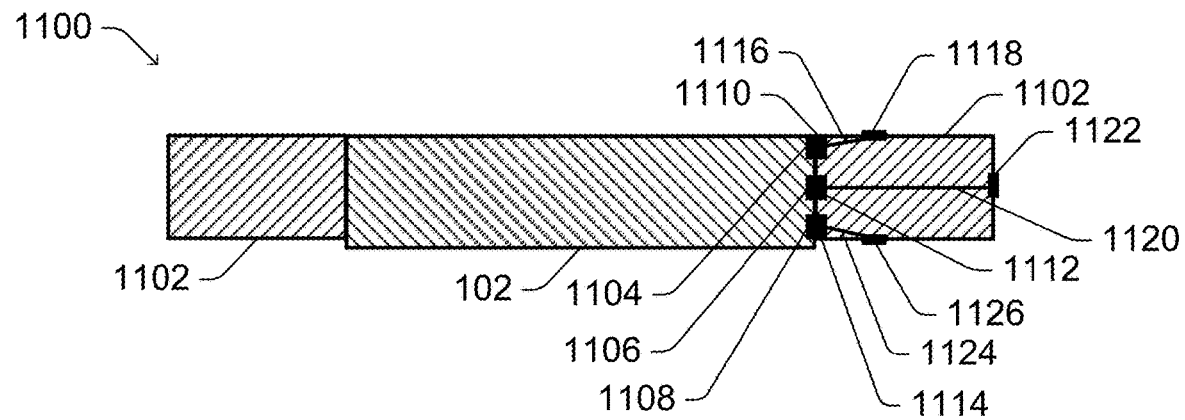

FIG. 11 illustrates an example cross-section of a system 1100 including a mount and an electronic device. The system 1100 includes a mount 1102 (e.g., which can be the mount 302 of FIG. 3) and an electronic device 102. The electronic device 102 includes three self-capacitive battery powered sensors (capacitive sensors) 1104, 1106, and 1108 along one edge of the electronic device 102. The mount 1102 includes a conductive plate 1110 (e.g., a piece of metal) that is physically touching the capacitive sensor 1104 or that is within a threshold distance (e.g., 3 millimeters) of the capacitive sensor 1104 when the electronic device 102 is attached to the mount 1102. The mount 1102 also includes a conductive plate 1112 (e.g., a piece of metal) that is physically touching the capacitive sensor 1106 or that is within a threshold distance (e.g., 3 millimeters) of the capacitive sensor 1106 when the electronic device 102 is attached to the mount 1102. The mount 1102 also includes a conductive plate 1114 (e.g., a piece of metal) that is physically touching the capacitive sensor 1108 or that is within a threshold distance (e.g., 3 millimeters) of the capacitive sensor 1108 when the electronic device 102 is attached to the mount 1102.

The mount 1102 further includes a conductor 1116 (e.g., made of any of a variety of metals) that couples the conductive plate 1110 to a conductive plate 1118 (e.g., a piece of metal). The mount 1102 also includes a conductor 1120 (e.g., made of any of a variety of metals) that couples the conductive plate 1112 to a conductive plate 1118 (e.g., a piece of metal), and a conductor 1124 (e.g., made of any of a variety of metals) that couples the conductive plate 1114 to a conductive plate 1126 (e.g., a piece of metal), If the mount 1102 with the electronic device 102 attached is worn by a user and the conductive plate 1118 is capacitively coupled to the user (e.g., physically touching the user's skin), then the capacitive sensor 1104 is capacitively coupled to ground via the first conductive plate 1118, the conductor 1116, and the conductive plate 1110. Thus, the capacitive sensor 1104 will detect that the capacitive sensor 1104 is touching a user's skin and thus that the electronic device 102 is being held or worn by a user. Similarly, if the mount 1102 with the electronic device 102 attached is worn by a user and the conductive plate 1122 (or 1126) is capacitively coupled to the user (e.g., physically touching the user's skin), then the capacitive sensor 1106 (or 1108) is capacitively coupled to ground via the conductive plate 1122, the conductor 1120, and the conductive plate 1112 (or via the conductive plate 1126, the conductor 1124, and the conductive plate 1114). Thus, the capacitive sensor 1106 (or 1108) will detect that the capacitive sensor 1106 (or 1108) is touching a user's skin and thus that the electronic device 102 is being held or worn by a user.

However, if the mount 1102 with the electronic device 102 attached is not worn by a user and none of the conductive plates 1118, 1122, and 1126 are capacitively coupled to ground (e.g., the mount 1102 with the electronic device 102 attached is in a purse or backpack), then the capacitive sensors 1104, 1106, and 1108 will not be capacitively coupled to ground and the capacitive sensors 1104, 1106, an 1108 will not detect that the capacitive sensors 1104, 1106, and 1108 are touching a user's skin, and thus that the electronic device 102 is not being held or worn by a user.

The system 1100 of FIG. 11 is similar to the system 400 of FIG. 4, except that two of the capacitive sensors (capacitive sensors 1104 and 1108) have been re-directed. The capacitive sensor 1106 determines whether the electronic device 102 is being worn by a user based on sensing information along the edge corresponding to (e.g., on a parallel plane as) the capacitive sensor 1104. However, whether the electronic device 102 is being worn by a user is further determined based on sensing information along non-corresponding edges to (e.g., on planes perpendicular to) the capacitive sensors 1104 and 1108. Thus, for example, if the electronic device 102 is not attached to the mount 1102 then the capacitive sensors 1104, 1106, and 1108 detect when a right side of the electronic device 102 is being touched by a user's finger(s). However, if the electronic device 102 is attached to the mount 1102 then the capacitive sensor 1104 detects when a top of the mount 1102 is being touched by one different part of the user's body depending on how the mount is worn or held (e.g., the user's wrist, the user's arm, the user's chest, etc.), the capacitive sensor 1106 detects when a side of the mount 1102 is being touched by a different part of the user's body depending on how the mount is worn or held (e.g., the user's fingers, the user's wrist, the user's arm, the user's chest, etc.), and the capacitive sensor 1108 detects when a bottom of the mount 1102 is being touched by a different part of the user's body depending on how the mount is worn or held (e.g., the user's wrist, the user's arm, the user's chest, etc.).

In one or more embodiments, the mount also includes sensors that provide functionality that the sensors 120 of the electronic device 102 do not provide. Thus, one or more sensors in the mount can provide new or additional functionality to the electronic device 102 rather than extending the sensors already present in the electronic device 102.

Figure 12:
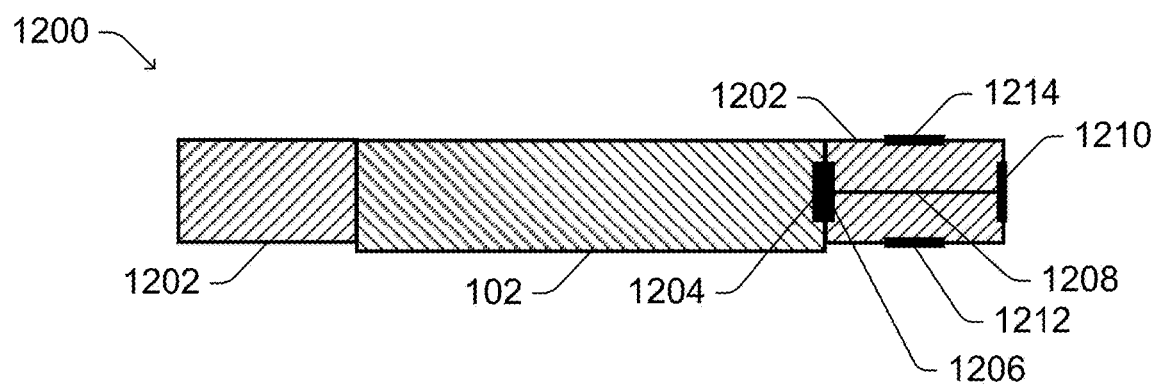

FIG. 12 illustrates an example cross-section of a system 1200 including a mount and an electronic device. The system 1200 includes a mount 1202 (e.g., which can be the mount 302 of FIG. 3) and an electronic device 102. The electronic device 102 includes a self-capacitive battery powered sensor (a capacitive sensor) 1204 along one edge of the electronic device 102. The mount 1202 includes a first conductive plate 1206 (e.g., a first piece of metal) that is physically touching the capacitive sensor 1204 or that is within a threshold distance (e.g., 3 millimeters) of the capacitive sensor 1204 when the electronic device 102 is attached to the mount 1202. The mount 1202 further includes a conductor 1208 (e.g., made of any of a variety of metals) that couples the first conductive plate 1206 to a second conductive plate 1210 (e.g., a second piece of metal).

If the mount 1202 with the electronic device 102 attached is worn by a user and the second conductive plate 1210 is capacitively coupled to the user (e.g., physically touching the user's skin), then the capacitive sensor 1204 is capacitively coupled to ground via the first conductive plate 1206, the conductor 1208, and the second conductive plate 1210. Thus, the capacitive sensor 1204 will detect that the capacitive sensor 1204 is touching a user's skin and thus that the electronic device 102 is being held or worn by a user. However, if the mount 1202 with the electronic device 102 attached is not worn by a user and the second conductive plate 1210 is not capacitively coupled to ground (e.g., the mount 1202 with the electronic device 102 attached is in a purse or backpack), the capacitive sensor 1204 will not be capacitively coupled to ground and the capacitive sensor 1204 will detect that the capacitive sensor 1204 is not touching a user's skin, and thus that the electronic device 102 is not being held or worn by a user.

The system 1200 of FIG. 12 is similar to the system 400 of FIG. 4, except that two additional sensors 1212 and 1214 are included in the mount 1202. The additional sensors 1212 and 1214 can be of the different or same type as the sensor 1204. For example, the sensor 1212 may be an optical sensor and the sensor 1214 may be a thermal sensor.

The sensors 1212 and 1214 sense different information based on the type of sensor (e.g., temperature, light, distance, etc.) and communicate this information to the electronic device 102. The sensed information can be communicated to the electronic device 102 using any of a variety of communication protocols and techniques, such as Bluetooth, near-field communication (NFC), wireless universal serial bus (USB), and so forth. The data sensed by the sensors 1212 and 1214 can optionally be processed by a processor system (e.g., one or more microprocessors) included in the mount 1202. This processing can take any of a variety of different forms, such as performing any of the operations performed by an application 110, operating system 108, or the power management system 114 of FIG. 1.

The inclusion of sensors in the mount 1202 that provide functionality that the sensor 1204 of the electronic device 102 does not provide allows additional functionality and information to be provided to the electronic device 102. For example, some electronic devices 102 may be too small to incorporate thermal, optical, and capacitive sensors. Accordingly, the electronic device 102 may include a capacitive sensor that is extended through the mount 1202, and the mount may include thermal and optical sensors. Thus, when attached to the mount 1202, the electronic device has the benefit of thermal, optical, and capacitive sensors even though only a capacitive sensor (and not a thermal or optical sensor) is included in the electronic device 102.

In one or more embodiments, various different viewpoints of a sensor 120 on the electronic device 102 can be changed. For example, the location of the sensor (e.g., on a particular edge, top, bottom, etc.) can effectively be changed by re-directing the sensor (e.g., as illustrated in FIGS. 8-10 above). This re-direction changes the spatial location of the sensor (e.g., to sense information from the bottom of the electronic device 102 rather than the side of the electronic device 102) and the line of sight of the sensor (e.g., so the line of sight is towards the bottom of the electronic device 102 rather than towards the right edge of the electronic device 102).

Additionally or alternatively, the viewpoint of a sensor 120 on the electronic device 102 can be changed in different manners, including changing the size of the sensor, changing the magnification of the sensor, changing the field of view of the sensor, and so forth. For example, referring to FIG. 4, the size of the second conductive plate 410 can be larger or smaller than the first conductive plate 406 (and the capacitive sensor 404). E.g., the second conductive plate 410 can have a larger (or smaller) surface area that can be touched by the user than the first conductive plate 406 (and the capacitive sensor 404) have. By way of another example, referring to FIG. 7, the magnification of the sensor 704 can be increased or decreased by using a lens as (or in addition to) the protective covering 710. By way of yet another example, the field of view of the sensor 704 can be increased or decreased by using as (or in addition to) the protective covering 710 a lens or other mechanism to increase or decrease the field of view of the sensor 704.

Figure 13:
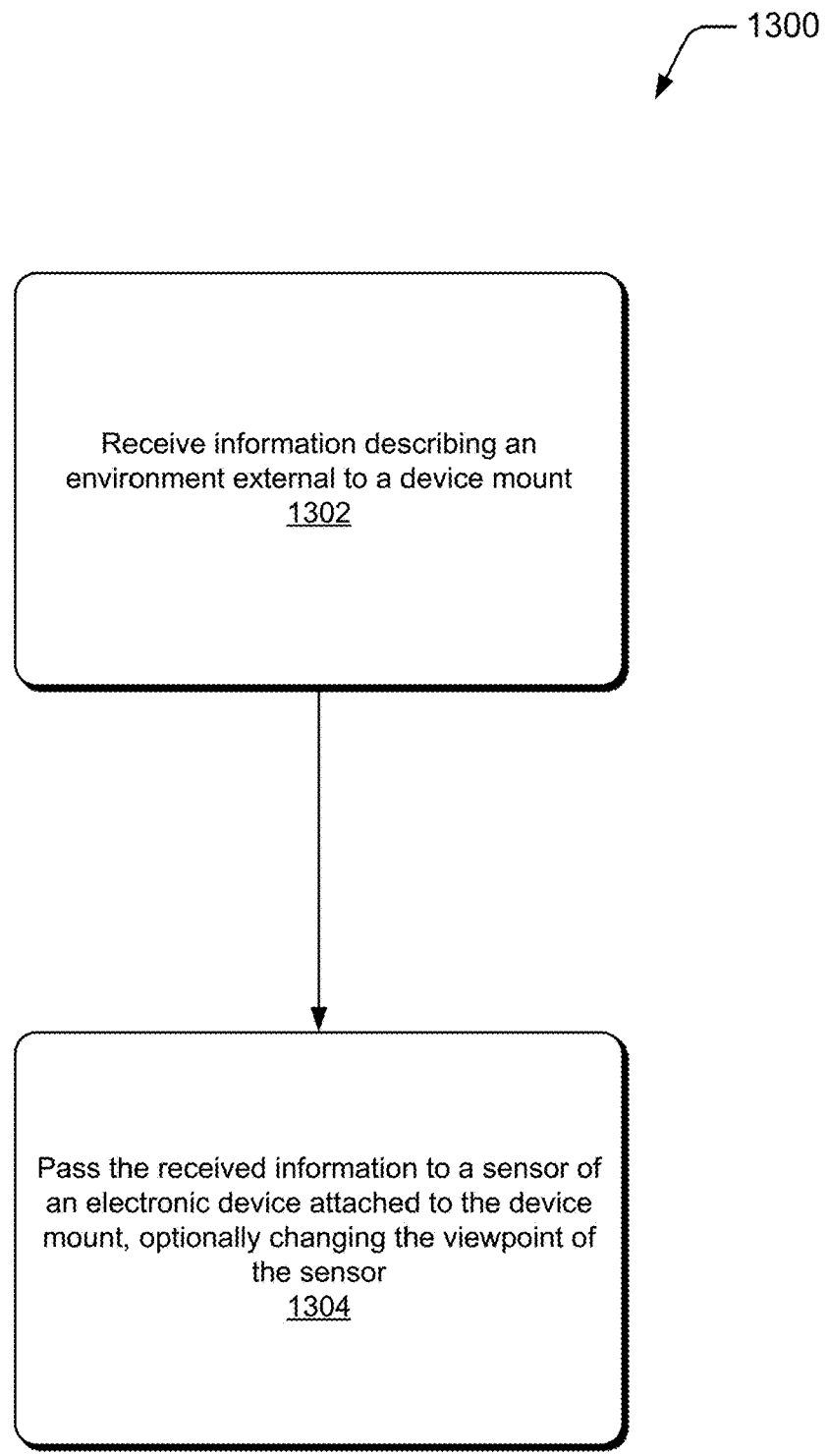
FIG. 13 illustrates an example process for implementing the techniques discussed herein in accordance with one or more embodiments.

FIG. 13 illustrates an example process 1300 for implementing the techniques discussed herein in accordance with one or more embodiments. Process 1300 is carried out by an electronic device mount, such as the mount 302 of FIG. 3. Process 1300 is shown as a set of acts and is not limited to the order shown for performing the operations of the various acts.

In process 1300, information describing an environment external to the device mount is received (act 1302). This information describing the environment external to the device mount can include, for example, the temperature of the environment external to the device mount, the amount of light external to the device mount, the proximity of a reflective surface to the device mount, and so forth.

The received information is passed through the device mount to a sensor of an electronic device attached to the device mount (act 1304). The information can be passed in any of a variety of different manners as discussed above, such as via a metallic conductor, an air tunnel, a thermal conductor, a light tunnel, and so forth. The viewpoint of the sensor of the electronic device is also changed, such as re-directing the line of sight or spatial location of the sensor as discussed above.

Figure 14:
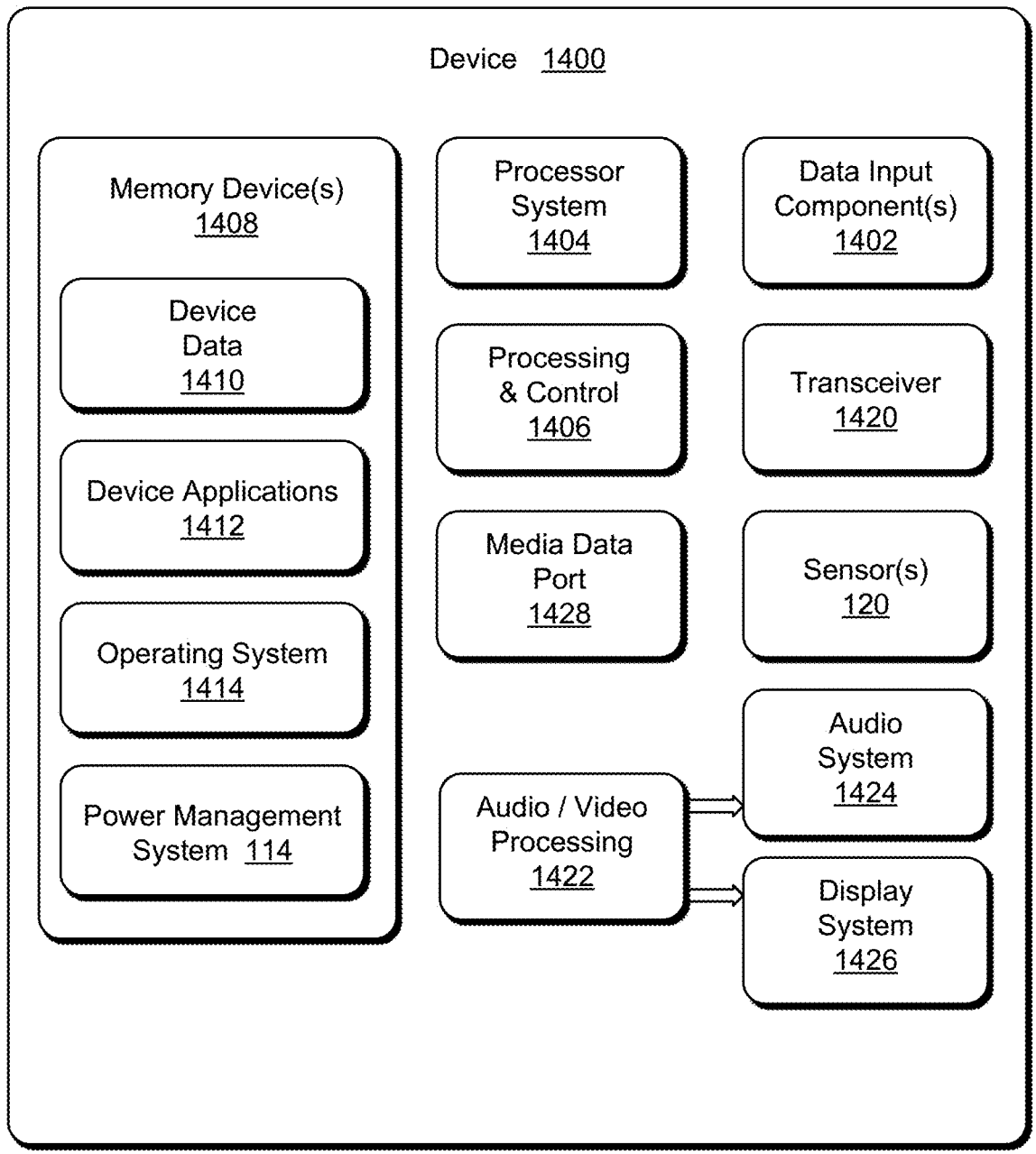
FIG. 14 illustrates various components of an example electronic device that can be used with the techniques discussed herein.

FIG. 14 illustrates various components of an example electronic device 1400 that can be implemented as a computing device as described with reference to any of the previous FIGS. 1-13. The device 1400 may be implemented as any one or combination of a fixed or mobile device in any form of a consumer, computer, portable, user, communication, phone, navigation, gaming, messaging, Web browsing, paging, media playback, or other type of electronic device.

The electronic device 1400 can include one or more data input components 1402 via which any type of data, media content, or inputs can be received such as user-selectable inputs, messages, music, television content, recorded video content, and any other type of audio, video, or image data received from any content or data source. The data input components 1402 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 1402 may also include various other input components such as microphones, touch sensors, keyboards, cameras or other image capture components, and so forth.

The electronic device 1400 of this example includes a processor system 1404 (e.g., any of microprocessors, controllers, and the like) or a processor and memory system (e.g., implemented in a system on a chip), which processes computer executable instructions to control operation of the device 1400. A processor system 1404 may be implemented at least partially in hardware that can include components of an integrated circuit or on-chip system, an application specific integrated circuit, a field programmable gate array, a complex programmable logic device, and other implementations in silicon or other hardware. Alternatively or in addition, the electronic device 1400 can be implemented with any one or combination of software, hardware, firmware, or fixed logic circuitry implemented in connection with processing and control circuits that are generally identified at 1406. Although not shown, the electronic device 1400 can include a system bus or data transfer system that couples the various components within the device 1400. A system bus can include any one or combination of different bus structures such as a memory bus or memory controller, a peripheral bus, a universal serial bus, or a processor or local bus that utilizes any of a variety of bus architectures.

The electronic device 1400 also includes one or more memory devices 1408 that enable data storage such as random access memory, nonvolatile memory (e.g., read only memory, flash memory, erasable programmable read only memory, electrically erasable programmable read only memory, etc.), and a disk storage device. A memory device 1408 provides data storage mechanisms to store the device data 1410, other types of information or data (e.g., data backed up from other devices), and various device applications 1412 (e.g., software applications). For example, an operating system 1414 can be maintained as software instructions with a memory device and executed by the processor system 1404.

In one or more embodiments the electronic device 1400 includes a power management system 114, described above. Although represented as a software implementation, the power management system may be implemented as any form of a control application, software application, signal processing and control module, firmware that is installed on the device 1400, a hardware implementation of the system 114, and so on.

The electronic device 1400 also includes one or more sensors 120. As discussed above, these sensors 120 can be on or more of a variety of different types of sensors, such as capacitive sensors, thermal sensors, optical sensors, ambient light sensors, and so forth.

Moreover, in one or more embodiments various techniques discussed herein can be implemented as a computer-readable storage medium having computer readable code stored thereon for programming a computing device (for example, a processor of a computing device) to perform a method as discussed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The computer-readable storage medium can be, for example, memory devices 1408.

The electronic device 1400 also includes a transceiver 1420 that supports wireless and/or wired communication with other devices or services allowing data and control information to be sent as well as received by the device 1400. The wireless and/or wired communication can be supported using any of a variety of different public or proprietary communication networks or protocols such as cellular networks (e.g., third generation networks, fourth generation networks such as LTE networks), wireless local area networks such as Wi-Fi networks, and so forth.

The electronic device 1400 can also include an audio or video processing system 1422 that processes audio data or passes through the audio and video data to an audio system 1424 or to a display system 1426. The audio system or the display system may include any devices that process, display, or otherwise render audio, video, display, or image data. Display data and audio signals can be communicated to an audio component or to a display component via a radio frequency link, S-video link, high definition multimedia interface (HDMI), composite video link, component video link, digital video interface, analog audio connection, or other similar communication link, such as media data port 1428. In implementations the audio system or the display system are external components to the electronic device. Alternatively or in addition, the display system can be an integrated component of the example electronic device, such as part of an integrated touch interface.

Although embodiments of techniques for implementing extending electronic device sensors through device mounts have been described in language specific to features or methods, the subject of the appended claims is not necessarily limited to the specific features or methods described. Rather, the specific features and methods are disclosed as example implementations of techniques for extending electronic device sensors through device mounts on a computing device.

What is claimed is:

1. A device mount attachable to an electronic device, the device mount extending capabilities of a first sensor on the electronic device to sense information regarding an environment in which the electronic device is placed and to re-direct a viewpoint of the first sensor by changing an angle at which information regarding the environment is sensed without requiring an additional sensor in the device mount.

2. The device mount as recited in claim 1, wherein re-directing the viewpoint of the first sensor includes re-directing the spatial location of the first sensor so that information is sensed by the first sensor on a different plane of the device mount than the edge of the electronic device on which the first sensor is located.

3. The device mount as recited in claim 1, wherein re-directing the viewpoint of the first sensor includes re-directing the line of sight of the first sensor so that information is sensed by the first sensor on a different plane of the device mount than the edge of the electronic device on which the first sensor is located.

4. The device mount as recited in claim 1, the electronic device having one or more second sensors, the device mount extending each of the one or more second sensors on the electronic device to sense information regarding the environment in which the electronic device is placed and re-directing a viewpoint of each of the one or more second sensors.

5. The device mount as recited in claim 1, the first sensor including an optical sensor, the device mount including a mirrored cavity to extend and re-direct the viewpoint of the optical sensor.

6. The device mount as recited in claim 1, the first sensor including an optical sensor, the device mount including a light guide or light tube to extend and re-direct the viewpoint of the optical sensor.

7. The device mount as recited in claim 1, the first sensor including a capacitive sensor and the device mount including a first conductive plate on a first plane parallel to a plane of the capacitive sensor and the first conductive plate touching the capacitive sensor while the device mount is attached to the electronic device, a second capacitive sensor on a second plane that is not parallel to the plane of the capacitive sensor, and a conductor through the device mount coupled to both the first conductive plate and the second conductive plate to extend and re-direct the viewpoint of the capacitive sensor.

8. The device mount as recited in claim 1, the first sensor including a thermal sensor and the device mount including a thermal conductor through the device mount to extend and re-direct the viewpoint of the thermal sensor.

9. The device mount as recited in claim 1, the device mount further including one or more second sensors that each provide functionality that the first sensor does not provide.

10. The device mount as recited in claim 1, the device mount further including changing a size of a surface area of the first sensor.

11. The device mount as recited in claim 1, the device mount further extending a second sensor on the electronic device to sense additional information regarding the environment the electronic device is placed in without re-directing a viewpoint of the second sensor.

12. A peripheral comprising a first one or more sensors, a processor to analyze information sensed by the first one or more sensors, and extending, independently of the first one or more sensors, capabilities of a second one or more sensors on an electronic device by changing a direction at which information regarding the environment is sensed by the one or more sensors.

13. The peripheral as recited in claim 12, the second one or more sensors including an optical sensor, the peripheral including a mirrored cavity to re-direct a line of sight of the optical sensor.

14. The peripheral as recited in claim 12, the second one or more sensors including an optical sensor, the peripheral including a light guide or light tube to re-direct a line of sight of the optical sensor.

15. The peripheral as recited in claim 12, the second one or more sensors including a capacitive sensor and the peripheral including a first conductive plate on a first plane parallel to a plane of the capacitive sensor and the first conductive plate touching the capacitive sensor while the device mount is attached to the electronic device, a second capacitive sensor on a second plane that is not parallel to the plane of the capacitive sensor, and a conductor through the peripheral coupled to both the first conductive plate and the second conductive plate to re-direct a line of sight of the capacitive sensor.

16. The peripheral as recited in claim 12, the second one or more sensors including a thermal sensor and the peripheral including a thermal conductor through the peripheral to re-direct a line of sight of the thermal sensor.

17. A method comprising:
receiving information describing an environment external to a device mount, an electronic device being attached to the device mount; and
extending capabilities of a first sensor on the electronic device by passing the received information through the device mount to the first sensor, the passing including re-directing a viewpoint of the first sensor by changing a direction at which information regarding the environment is sensed without requiring an additional sensor in the device mount.

18. The method as recited in claim 17, wherein re-directing the viewpoint of the first sensor includes re-directing the spatial location of the first sensor so that information is sensed by the first sensor on a different plane of the device mount than the edge of the electronic device on which the first sensor is located.

19. The method as recited in claim 17, wherein the first sensor includes a capacitive sensor and re-directing the viewpoint of the first sensor includes re-directing the line of sight of the first sensor using a conductor coupled to both a first conductive plate on a first plane parallel to a plane of the capacitive sensor and a second conductive plate approximately perpendicular to the plane of the capacitive sensor so that information is sensed by the capacitive sensor on a different plane of the device mount than the edge of the electronic device on which the capacitive sensor is located.

20. The method as recited in claim 17, the electronic device having one or more second sensors, the device mount extending each of the one or more second sensors on the electronic device to sense information regarding the environment in which the electronic device is placed and re-directing a viewpoint of each of the one or more second sensors.

* * * * *